July 25, 1939. M. L. WARNER 2,167,255

AUTOMATIC CONTROLLER FOR COFFEE MAKERS

Filed May 25, 1937

INVENTOR
MAURICE LEE WARNER
BY
ATTORNEYS

Patented July 25, 1939

2,167,255

UNITED STATES PATENT OFFICE 2,167,255

AUTOMATIC CONTROLLER FOR COFFEE MAKERS

Maurice Lee Warner, Leeds, Ala., assignor to The Silex Company, a corporation of Connecticut Application May 25, 1937, Serial No. 144,584

2 Claims. (Cl. 200—138)

This invention has to do with a combined cover and circuit controller for a beverage maker of the electrically heated, vacuum type having an infusion chamber, a heating chamber and a transfer connection between the two.

In using such coffee-making apparatus, water is placed in the lower heating chamber and ground coffee in the upper chamber. The heating means is then brought into action to heat the water in the heating chamber. As the temperature of the water approaches the boiling point, the water is forced by its own vapor pressure through the transfer means into the infusion chamber, where the hot water is infused with the soluble components of the ground coffee to make beverage coffee. The heating then is stopped and as the lower chamber cools, the water vapor or steam in it condenses, whereupon the beverage coffee is forced by atmospheric pressure back through the transfer means to the heating chamber, ready for consumption, the extracted ground coffee being retained in the infusion chamber by a filter or its equivalent.

An automatic controller for such a coffee maker has already been provided, comprising a unitary cover and thermostatically controlled circuit breaker adapted to be placed on the infusion chamber in lieu of the conventional cover. The object of the present invention is to provide a simple and compact construction of such unitary device, in order to lessen the manufacturing cost and to make it possible to preserve an attractive appearance as a cover despite the incorporation of the circuit breaker parts.

In the accompanying drawing.

Figure 1:
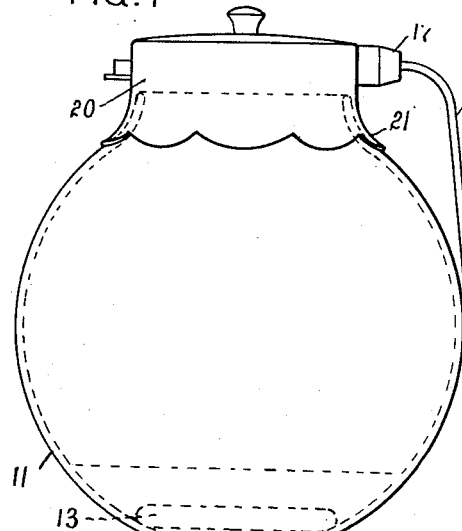
Fig. 1 is an elevation of a vacuum-type coffee making apparatus provided with an infusion chamber cover member equipped with apparatus of the invention.
Figure 2:
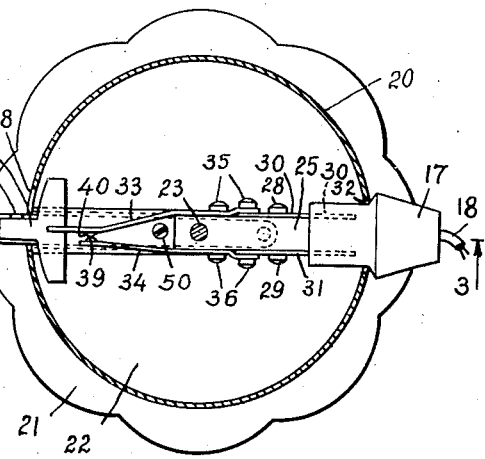
Fig. 2 is a section through the infusion chamber cover member, taken substantially along the line 2—2 of Fig. 3.
Figure 3:
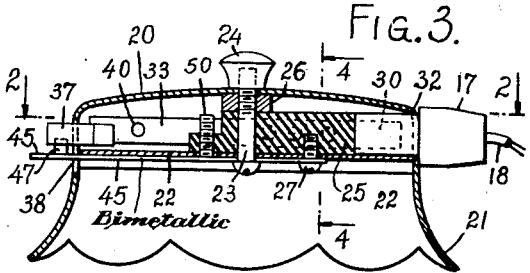
Fig. 3 is a section taken substantially along the line 3—3 of Fig. 2.
Figure 4:
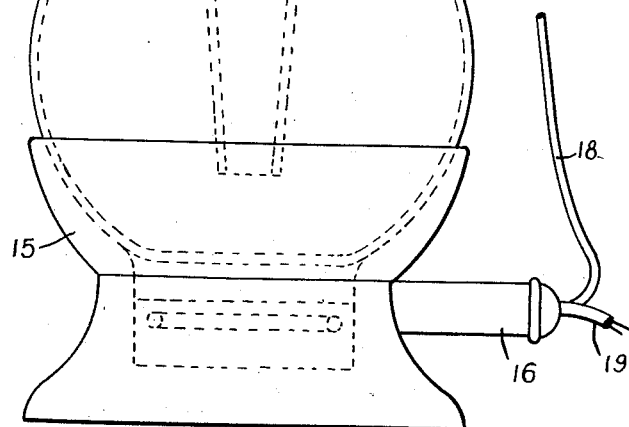
Fig. 4 is a section through the circuit breaking apparatus of the invention, taken substantially along the line 4—4 of Fig. 3.
Figure 4:
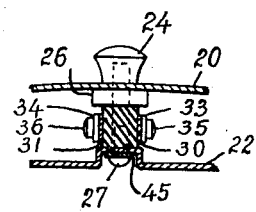

The coffee-maker, here conventionally shown, comprises a lower bowl 10 which forms the heating chamber, an upper bowl 11 forming the infusion chamber, both of which preferably are made of glass, and a transfer tube 12, also preferably of glass and integral with the upper bowl, extending from the upper bowl down into the lower bowl. There is a strainer or filter 13 at the upper end of the transfer tube. A rubber plug 14 fits about the upper part of the transfer tube and is received in the neck of the lower bowl 10. The lower bowl rests on an electric stove 15 by which the liquid in the lower bowl is heated. The stove has terminals arranged to receive a plug 16 by which it is connected to the supply circuit.

In the operation of such a coffee-maker, the liquid is heated in the lower bowl. The vapor thus generated, being contained in the lower bowl, eventually forces the liquid through the transfer tube to the upper bowl where the coffee is held by the filter 13. The infusion then takes place and the liquid is returned to the lower bowl when the heater is cut-off and the vapor in the lower bowl condenses, forming a partial vacuum. The length of the infusion period affects the strength and flavor of the coffee so it is desirable to be able to cut-off the heater automatically at the appropriate instant within the range of different tastes. Preferably the stove is of the quick cooling type which permits the condensation in the lower bowl to take place at a proper interval after the heat is cut off.

The present invention, described here in its preferred form, furnishes a simple and compact cover and circuit breaker unit that meets the functional requirements and at the same time permits the requirements with respect to appearance to be met.

The unit 20 rests on the upper bowl and has terminals receiving a plug 17 at the end of a two-wire cord 18 extending from the heater plug 16 where the cord 18 is connected with the wires of the main supply cord 19. The connection is such as to put the circuit-breaker in series with the heater element so that opening and closing of the breaker can control the heater.

The unit 20 has the same general shape as covers already known, which are designed from the standpoint of appearance in harmony with the design of the coffee-maker as a whole. It has a flared rim 21 which conforms to and rests on the outer surface of the upper bowl near its rim. The cover is made somewhat deeper, that is to say, the distance from the top wall to the rim is somewhat greater, than in a conventional cover owing to the necessity of accommodating the circuit-breaker parts within the cover. But this increase of depth is minimized by the compactness of the present construction.

A shallow chamber for the circuit-breaker parts is provided above a partition which is in the form of a disc 22 extending fully across the cover. This disc is held in place by a central post 23 which extends up through the top of the cover and threads into a nut 24 on the top which serves as a knob for grasping the cover. The disc 22 is spaced from the top of the cover by the insulating block 25 which serves as the base for the circuit-breaker parts and, if desired, by an additional spacer which may take the form of a washer 26 threaded on the central post. The insulating base is secured to the disc 22 by a small screw 27 entering from the under side.

At one end of the base and attached to its opposite side walls by screws 28, 29 are the two prongs 30, 31 which serve as the terminal connections to receive the plug 17 of the extension cord by which the circuit-breaker is connected in series in the main circuit of the heater. These prongs extend approximately to the side wall of the cover. Opposite them there is a port 32 in the side wall of the cover which permits the plug 17 to be inserted.

The contactor elements of the circuit-breaker consists of two strips of flexible and resilient conductive metal 33, 34, one secured to each side of the base by screws 35 and 36 so as to overlap and thereby have a good conductive contact with the terminal prong secured to that side of the base. One contactor element 33, which will be referred to as the movable element, is longer than the other and has an actuating element or a thumb piece 37 of insulating material at its end. This thumb piece extends through a port 38 in the side wall of the cover so as to be accessible from the outside. It has wings which extend sidewise to shield the opening in the wall whether the thumb piece is moved to one side or the other.

The shorter contactor element 34, which will be referred to as the fixed element, although it is capable of some sidewise motion due to its resilience, has a small contact point 39 on its inner side at its free end, opposite a similar contact point 40 on the inner side of the movable contactor element. The movable contactor 33 is bent inward toward the fixed contactor and has a bias away from it, so that normally it is spaced from the fixed contactor thus holding the circuit open. The circuit is closed by moving the movable contactor over into contact with the fixed element. The two contactors are so arranged that they touch before the movable element is at the end of its normal range of movement so that in the final part of its movement it presses the fixed element backward by a slight amount thus assuring a good contact between them.

The thermostatic element is arranged to hold the movable contactor in its closed circuit position against the fixed element. Then upon heating, when the thermostatic element reacts to the requisite extent, it releases the movable contactor and permits the latter to move to the open circuit position as a result of its inherent resilience.

Specifically the thermostatic element consists of a bi-metallic strip 45 which is secured at one end to the under side of the partition by the central post 23 and the screw 27 which secures the insulating base to the partition. This thermostatic strip is located in a transverse channel 46 that extends across the partition. It extends through the same port 38 in the side wall of the cover through which the thumb piece 37 extends. At one edge of this extending portion of the thermostat element, the edge that lies on the side toward the open circuit position of the movable contactor, there is a projection in the form of an upstanding lug 47 lying in the path of the thumb piece. This lug is the element by which the thermostat holds the circuit-breaker closed and at the proper time releases it to cause the circuit to be opened. The thermostatic element is resilient and normally it lies close against the surface of the partition. Hence, the lug normally is in position to hold the movable contactor in closed circuit position. When the free end of the thermostat is depressed, either manually or by reason of its expansion due to heating, the lug is drawn down out of engagement with the thumb piece and thereby releases the movable contactor so that it opens the circuit. The circuit can be closed again only by manipulation of the thumb piece.

If desired the movement of the thumb piece to open position can be limited at such a point that it is entirely at one side of the lug. Then when the thermostat cools and the lug returns to its upward position it prevents inadvertent closing of the circuit, for the lug must be depressed before the thumb piece can be moved. Alternatively, the movement of the thumb piece can be limited so that some part of it overlies the lug and prevents its rise until the circuit is closed.

It is desirable to adjust the thermostatic element so that it may release the thumb piece and cause the circuit-breaker to open the circuit at any of a number of different temperatures. This makes it possible to vary the length of the infusion period according to the desired strength of the coffee. This adjustment is accomplished by a small screw 10 which extends through the insulating piece from above into engagement with the free portion of the thermostatic element. By turning this screw down, the thermostatic element is depressed and the amount of movement in response to heating that is necessary before the lug is moved out of contact with the thumb piece is thereby lessened. Thus the thermostat may be given a position or setting corresponding to any of a number of different releasing temperatures.

Various modifications of the structure here described may be made within the scope of the invention defined in the following claims.

I claim:

1. A cover and circuit-breaker unit for the infusion chamber of a vacuum type coffee-maker, comprising a partition extending across said cover, an insulating base on the upper side of said partition, resilient contact members mounted on opposite sides of said base and normally in open position, a thumb piece engageable outside the cover for moving one of said contact members sidewise into closed position, a thermostatic element comprising a bi-metal strip on the lower side of said partition with a free end extending beneath the thumb piece, and a projection on the said strip adapted to hold the thumb piece in closed position at normal temperatures and to release it when heated.

2. A cover and circuit-breaker unit for the infusion chamber of a vacuum type coffee-maker, comprising a cover member having top and side walls, a partition extending across the cover forming a chamber bounded by the partition, the top wall and a portion of the side wall of said cover, a circuit breaker in said chamber having contact members extending across said chamber, a thumb piece connected to one of said contacts, the latter being resilient, and extending outside of the side wall of said cover, a thermostatic element on the lower side of said partition with a free end extending beneath the thumb piece and engageable outside said cover, and means by which the said element is adapted to hold the circuit breaker in closed position at normal temperature and to release it when heated.

MAURICE LEE WARNER.